United States Patent
Pelka et al.

(10) Patent No.: US 10,859,147 B2
(45) Date of Patent: Dec. 8, 2020

(54) VEHICLE SEAT WITH ADJUSTMENT DEVICE

(71) Applicant: GRAMMER AG, Amberg (DE)

(72) Inventors: Joachim Pelka, Amberg (DE); Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 107 days.

(21) Appl. No.: 16/217,205

(22) Filed: Dec. 12, 2018

(65) Prior Publication Data

US 2019/0178355 A1 Jun. 13, 2019

(30) Foreign Application Priority Data

Dec. 12, 2017 (DE) .................. 10 2017 129 556

(51) Int. Cl.
*F16H 37/12* (2006.01)
*B60N 2/16* (2006.01)
(Continued)

(52) U.S. Cl.
CPC ............... *F16H 37/12* (2013.01); *B60N 2/10* (2013.01); *B60N 2/164* (2013.01); *B60N 2/1842* (2013.01);
(Continued)

(58) Field of Classification Search
CPC .......... B60N 2/767; B60N 2/77; B60N 2/763; B60N 2/753; B60N 2/773; B60N 2/797;
(Continued)

(56) References Cited

U.S. PATENT DOCUMENTS

| | | | | |
|---|---|---|---|---|
| 4,478,308 A | * | 10/1984 | Klaassen | B60K 26/00 180/326 |
| 4,652,049 A | * | 3/1987 | Maruyama | A47C 7/14 297/284.11 |

(Continued)

FOREIGN PATENT DOCUMENTS

| | | |
|---|---|---|
| DE | 10239722 | 7/2003 |
| EP | 1982864 | 10/2008 |
| EP | 1982865 | 10/2008 |

OTHER PUBLICATIONS

Extended Search Report for European Patent Application No. 18205847.9, dated Apr. 25, 2019, 3 pages.
Official Action for German Patent Application No. 102017129556. 9, dated Aug. 10, 2018, 3 pages.

*Primary Examiner* — Daniel D Yabut
(74) *Attorney, Agent, or Firm* — Sheridan Ross P.C.

(57) ABSTRACT

The invention relates to a vehicle seat with at least one laterally positioned operating device for operating the vehicle seat functions and/or vehicle functions and an adjustment device for adjusting a vertical position and/or an inclination of the at least one operating device with respect to a rest of the vehicle seat, wherein the adjustment device comprises a rotational axis extending in the seat width direction and a shaft which is connected to the operating device, positioned at a distance from the rotational axis and rotatable together with the operating device about the rotational axis, wherein the adjustment of the vertical position and/or of the inclination of the operating device is feasible by means of a rotational movement of a spindle element which is in operative contact with the shaft, wherein a central axis of the spindle element is perpendicular to a central axis of the shaft.

9 Claims, 6 Drawing Sheets

(51) Int. Cl.
*F16H 21/44* (2006.01)
*B60N 2/10* (2006.01)
*F16H 25/20* (2006.01)
*B60N 2/18* (2006.01)
*B60N 2/24* (2006.01)
*B60N 2/75* (2018.01)
*B60N 2/38* (2006.01)

(52) U.S. Cl.
CPC ............... *B60N 2/24* (2013.01); *B60N 2/38* (2013.01); *B60N 2/767* (2018.02); *B60N 2/77* (2018.02); *B60N 2/797* (2018.02); *F16H 21/44* (2013.01); *F16H 25/20* (2013.01)

(58) Field of Classification Search
CPC .......... B60N 2/793; B60N 2/38; B60N 2/164; B60N 2/1853; B60N 2/1842; B60N 2/10; F16H 2025/2043; F16H 25/14; F16H 21/44
See application file for complete search history.

(56) References Cited

U.S. PATENT DOCUMENTS

| | | | | |
|---|---|---|---|---|
| 4,995,580 | A * | 2/1991 | Fujii | B60N 2/1615 248/394 |
| 6,341,821 | B1 * | 1/2002 | Rousseau | B60N 2/24 297/411.36 |
| 7,014,255 | B2 * | 3/2006 | Amamiya | B60N 2/143 296/190.08 |
| 2003/0112583 | A1 * | 6/2003 | Kim | B60N 2/77 361/622 |
| 2008/0252114 | A1 * | 10/2008 | Kim | B60N 2/544 297/216.15 |
| 2010/0026026 | A1 * | 2/2010 | Akahane | B60N 2/77 296/24.34 |
| 2011/0115275 | A1 * | 5/2011 | von Rothkirch und Panthen | B60N 2/77 297/411.32 |

* cited by examiner

VEHICLE SEAT WITH ADJUSTMENT DEVICE

CROSS-REFERENCE TO RELATED APPLICATION

This application claims the benefit of German Patent Application No. DE 10 2017 129 556.9 filed Dec. 12, 2017, the entire contents of which are incorporated herein by reference.

FIELD

The invention relates to a vehicle seat with at least one laterally positioned operating device for operating vehicle seat functions and/or vehicle functions and an adjustment device for adjusting a vertical position and/or an inclination of the at least one operating device with respect to the rest of the vehicle seat, wherein the adjustment device comprises a rotational axis extending in the seat width direction and a shaft which is connected to the operating device, positioned at a distance from the rotational axis and rotatable together with the operating device about the rotational axis.

BACKGROUND

Generic vehicle seats which are provided with such operating devices are already well-known in the art. These operating devices include, for example, a type of control lever (joystick) and other operating elements such as buttons or switches and thus offer the driver or user, for example, the opportunity to adjust, move and/or activate elements such as the vehicle seat and/or elements which are arranged on a vehicle associated with the vehicle seat, such as an excavator bucket.

Often, these operating devices are mechanically at least partially decoupled from adjustment devices of the seat for the height and/or longitudinal position of the seat, and are arranged laterally on the seat, for example. If an operator now sits down on the seat and has to adjust the height of the seat, the operating devices may not be easily accessible to him. Furthermore, known adjustment devices for said operating devices may be designed in a bulky manner.

SUMMARY

It is therefore the aim of the present invention to develop an adjustment device for a generic vehicle seat which allows an adjustment of the operating device with respect to its vertical position and/or in terms of its inclination and which is constructed in a space-saving manner.

The aim of the invention is achieved by a vehicle seat with at least one laterally positioned operating device for operating the vehicle seat functions and/or vehicle functions and an adjustment device for adjusting a vertical position and/or an inclination of the at least one operating device with respect to the rest of the vehicle seat, wherein the adjustment device comprises a rotational axis extending in the seat width direction and a shaft which is connected to the operating device, positioned at a distance from the rotational axis and rotatable together with the operating device about the rotational axis, wherein the adjustment of the vertical position and/or of the inclination of the operating device is feasible by means of a rotational movement of a spindle element which is in operative contact with the shaft, wherein a central axis of the spindle element is perpendicular to a central axis of the shaft.

The arrangement of the central axis of the spindle element perpendicular to the central axis of the shaft ensures that the spindle element does not have to be arranged behind the shaft with respect to its length direction. On the contrary, the two elements can be arranged at least partially on top of each other, which reduces the overall space requirements.

For example, it is provided that a distance between the central axis of the rotational axis and the central axis of the shaft has a value in a range of 200 mm to 300 mm, preferably of 230 mm to 240 mm, most preferably of 237.4 mm.

The rotational axis remains rigid during actuation of the adjustment device. The shaft rotates together with the operating device about the rotational axis.

Furthermore, the shaft can be pivoted about the rotational axis in a simple manner manually or automatically, for example by the user of the seat setting the height of the operating device before the start of the journey and after adjusting the height of the seating surface. Since the shaft is connected to the operating device, the operating device can be easily pivoted therewith. By pivoting, both the vertical position and the inclination of the operating device with respect to the rest of the vehicle seat can preferably be changed. In this case, the rest of the vehicle seat is, for example, everything that is not pivoted or, for example, the seat substructure.

It is conceivable that the spindle element is connected to a handle element. This handle element can be provided, for example, with a display device which indicates to the user how the direction of rotation of the handle element is linked to the change of height and/or inclination of the operating device. Thus, it is conceivable that the handle element is configured as a hand knob. Furthermore, it is conceivable that a double-headed rotary arrow is illustrated on the handle element, which points in the clockwise and counterclockwise direction and is provided with the characters "+" for "raise" or "−" for "lower".

For example, this handle element is positioned in the length direction of the vehicle seat next to the spindle element, on the right side of the vehicle seat and/or beneath a seat portion of the vehicle seat. Thus, an ergonomic position for the adjustment option of the spindle element is provided.

It is conceivable that a respective adjustment device is arranged on both sides of the vehicle seat. According to a preferred embodiment, however, the vehicle seat is provided with a single adjustment device and with a respective operating device on both sides, i.e. to the left and to the right of the user. It is also advantageous if the shaft, starting from a central position, is pivotable about the rotational axis by an angle in a range from +/−2° to +/−10°, preferably by +/−4°.

Advantageously, a distance between the rotational axis and the shaft can be permanently set and the rotational axis is positioned behind the shaft in the seat length direction. Advantageously, the rotational axis is arranged in the seat height direction above the shaft.

Furthermore, the shaft is advantageously arranged in the seat height direction above the spindle element. All arrangements are advantageously independent of the position of the shaft within its adjustment ranges, which are defined for example on the basis of the slotted guide described in more detail below.

It is also advantageous if a slide element is arranged as part of the operative connection between the shaft and the spindle element at a first end of the spindle element, wherein an internal thread of the slide element is in operative contact with an external thread of the spindle element, so that the rotational movement of the spindle element is transmissible into a translational movement of the slide element.

It is therefore advantageously possible to avoid the use of expensive spindle gears such as a ball screw spindle gear. Instead, a threaded spindle gear is sufficient. Preferably, the slide element has a substantially cylindrical shape at a first end which bears the internal thread. Furthermore, the slide element is preferably shaped substantially like a fork having two planar fork elements at a second end, which faces away from the internal thread.

A bearing element is preferably provided, by means of which the spindle element is rotatably mounted, and which is at least indirectly connected to a seat substructure of the vehicle seat. For example, the bearing element is a bent sheet metal part.

By means of the described arrangement, in particular the degree of friction between the internal thread of the slide element and the external thread of the spindle element can be individually set. Thus, it is preferred that a locking of the shaft can be achieved by means of the interaction between the internal thread of the slide element and the external thread of the spindle element, wherein the adjustment device is configured without an additional locking device for locking a position of the shaft with respect to the pivoting about the rotational axis. This is preferably ensured even if two operating devices are arranged on the vehicle seat which are adjusted by means of a single adjustment device.

Expensive locking devices are therefore eliminated. A further advantage is that the steps relating to the release and the locking of the locking device are eliminated, since these correspond simultaneously to the steps relating to the actual adjustment. It is ensured that the force required to release the locking can be applied manually. Furthermore, it is ensured that the force required for ensuring the locking can be provided by means of the frictional connection between the internal thread and the external thread.

It is also preferable if a first lever element is rotatably mounted by a first end on a first end of the slide element remote from the spindle element as another part of the operative connection between the spindle element and the shaft, wherein a second end of the first lever element is connected to the shaft.

The shaft is thus driven by means of a coupling piece in the form of the first lever element by the described kinematic system.

Preferably, the first end of the first lever element and the first end of the slide element are each provided with a hole by means of which a rotary bearing element for the described mutually rotatable mounting of both elements can be received. More preferably, the operative connection between the spindle element and the shaft is formed only by means of the spindle element, the slide element, the first lever element, the rotary bearing element and the shaft, and is in particular free of other elements. This applies to the components of an adjustment device on a single side of the seat.

Preferably, the spindle element, the slide element and/or the first lever element are arranged parallel to each other with respect to their longitudinal extension. Particularly preferably, the slide element and/or the first lever element are similarly arranged perpendicularly to the central axis of the shaft with respect to their longitudinal extension, like the central axis of the spindle element. These arrangements ensure the most space-saving arrangement of the components possible.

In order to ensure the simplest possible restriction of the movement of the shaft and thus to define the possible adjustment range of the adjustment device or the operating device, it is preferred if the shaft is movable within a slotted guide of a slotted guide element with respect to the pivoting about the rotational axis, wherein a shape of the slotted guide is configured to extend along a portion of an arc, wherein the arc is preferably configured to extend concentrically about the rotational axis. Within the meaning of the invention, this arc can also be described as a "guide arc" and can be understood as a virtual arc. The shaft is thus mounted in a floating manner by means of the described kinematic and is preferably guided in the slotted guide.

It is useful if the slotted guide element is arranged on the seat, for example at a bearing point of the seat substructure, and in particular is not movable with the shaft. Preferably, the bearing point between the slotted guide element and the seat substructure is configured by means of a floating bearing, which initially (with a not yet mounted operating device) allows horizontal movements of the slotted guide element along the seat width and/or the seat length direction while blocking vertical movements along the seat height direction. This can be realized for example by a horizontally arranged tab of the slotted guide element being arranged within a groove or a slit of a vertically arranged tab of an element of the seat substructure, such as a longitudinal strut.

More preferably, in the case of a completely mounted operating device, a fixed mounting of the slotted guide element is achieved by means of the shaft which is guided in the slotted guide of the slotted guide element and preferably has a fixed distance from the rotational axis, together with the seat substructure.

Preferably, the bearing element for the spindle element is arranged directly and completely beneath the slotted guide element and is connected thereto.

Furthermore, it is convenient if the operating device and the shaft are connected by means of an intermediate element, wherein this intermediate element is configured, for example, as a housing part. Within or on this intermediate element, for example, other elements such as the electronic components, the power supply or the controller of the operating device are arranged. It is also useful if the mounting of the shaft can be achieved by means of a bearing element of this intermediate element.

Thus, within the slotted guide described above, the shaft can be pivoted mechanically safely guided by a certain angle, preferably by +4° to −4°, starting from a home position of 0°. The number of adjustment positions is at least theoretically unlimited, since the shaft can be continuously moved by means of its pivoting about the rotational axis within the slotted guide from a topmost portion to a lowermost portion. It is thus possible, by means of the described adjustment device, to provide a continuous adjustment of the vertical position and/or of the inclination of the operating device relative to a rest of the vehicle seat.

The described mechanical system therefore causes a transmission of the rotational movement of the spindle element about its own central axis into a pivoting movement of the shaft about the rotational axis. The degree of this transmission can be changed, for example, by varying the transmission ratio between spindle element and slide element and/or the length of the first lever element. Preferably, however, the degree of transmission is configured such that, in order to reach a topmost position of the shaft, starting from the central position thereof, the spindle element has to be rotated by about 7 revolutions. Overall, the adjustment device according to the invention preferably has a total stroke of 14 to 16 revolutions of the spindle element, most preferably of 15 revolutions.

It is also advantageous if the rotational axis is formed, for example, by means of the central axis of a second shaft or a bushing and/or the rotational axis is free of translational and/or rotational degrees of freedom with respect to the rest of the vehicle seat. For example, the rotational axis is mounted in a connector or holding member, which in turn is firmly or rigidly connected to the seat substructure.

Particularly advantageously, at a vehicle seat with two operating devices, one of which is arranged on the left and the other on the right side of the seating surface, only some of the components of the adjustment device according to the invention are arranged on both sides of the vehicle seat. Furthermore, it is advantageous if an adjustment of the vertical position and/or of the height of both operating devices is feasible by means of a single spindle element. This can be made possible for example by means of an operative connection between the two sides of the vehicle seat.

In particular, it is preferred that a shaft element is arranged in the seat width direction, its first end is rotatably connected to the first end of the first lever element by means of a second lever element that is rigidly connected to the shaft element, wherein a second end of the shaft element is rigidly connected to another second lever element.

For example, the shaft element is rotatably mounted on a seat substructure. Since the first lever element is connected to the one end of the slide element, the second lever element is also connected to the one end of the slide element.

In particular, it is preferred that the other second lever element is also arranged rotatably with a first end of another first lever element. This in turn can be connected, for example by means of a second end, to another shaft. This other shaft can finally also be connected to the other operating device.

The described mechanical system thus causes that the rotational movement of the spindle element is transmissible into a translational movement of the slide element at first. Due to the connection between the second lever element, the first lever element, the shaft element and the other first and second lever element, the translational movement of the slide element is transmissible both into a rotational movement of the shaft on the first side of the vehicle seat and into a rotational movement of the other shaft on the second side of the vehicle seat.

In this case, the operative connection between the spindle element on the first side of the vehicle seat and the other shaft on the second side of the vehicle seat is preferably only formed by means of the spindle element, the slide element, the first and the other first lever element, the rotary bearing element in duplicate, the second lever element and the other second lever element, the shaft element, the shaft and the other shaft and is in particular free of other elements.

In order to reduce the number of parts used, it has been proven advantageous for the components of the adjustment device which are arranged on the first side of the vehicle seat to be identical to the corresponding components of the adjustment device which are arranged on the second side of the vehicle seat.

Thus, in particular the shafts and the first and second lever elements can each be configured to be identical to each other. In order to be able to use the same components on the first and the second side of the vehicle seat, it is conceivable, for example, that, for this purpose, the shafts and the first and/or the second lever elements have at least one mirror symmetry plane; preferably, this mirror symmetry plane is parallel to the longitudinal extension of the shafts, of the first and/or of the second lever elements in each case.

Of course, the shaft is cylindrically shaped and has any number of mirror symmetry planes. If it additionally comprises a securing element for preventing rotation with respect to the operating device, for example in the form of a keyway, it has exactly one mirror symmetry plane. For example, the first and second lever elements are furthermore designed in the form of flat, non-bent sheet metal parts, which accordingly also have a plane of symmetry.

Overall, it is ensured that the installation space required for the mechanical/kinematic systems of the adjustment device between the vehicle seat and the operating device is minimized. By choosing the mechanical system which, as described, is advantageously configured as a toggle lever kinematic system, and the articulation points thereof, an approximately uniform progression of, or only a small increase in, the spindle force over the adjustment range upon actuation of the adjustment device is ensured. The mechanical/kinematic system shown also allows a continuous adjustment. In addition, a self-locking of the kinematic system is ensured.

BRIEF DESCRIPTION OF THE DRAWINGS

Further advantages, aims and characteristics of the present invention will be explained with reference to the accompanying drawings and the following description, in which an example of a vehicle seat with an adjustment device according to the invention is shown and described. In the drawings:

FIG. 5a is a sectional view along the section A-A of FIG. 3a; and

FIG. 5b is a detailed view of the portion B according to FIG. 5a.

DETAILED DESCRIPTION

Figure 1:
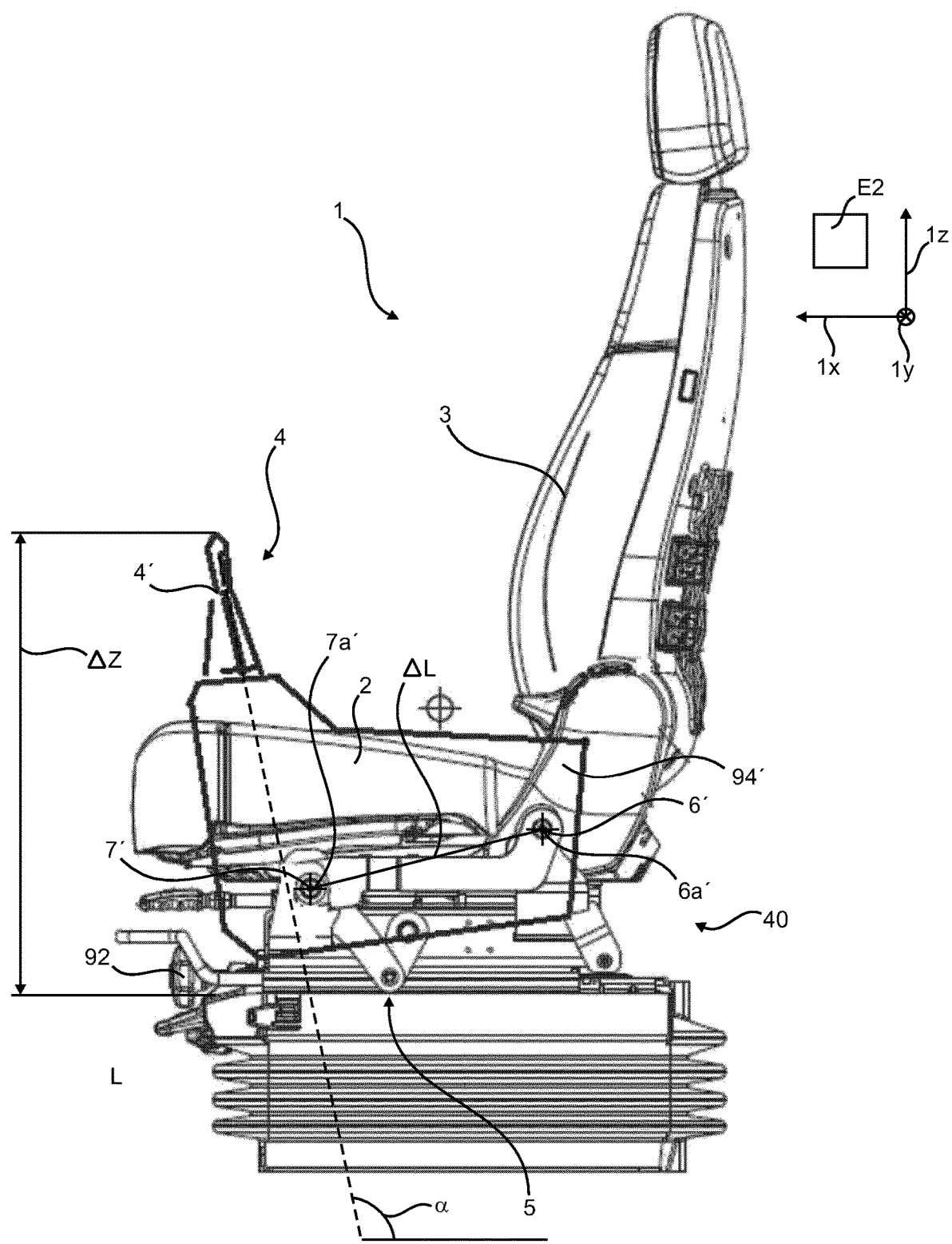
FIG. 1 is a side view of a vehicle seat according to the invention with an operating device and an adjustment device.

A possible embodiment of the vehicle seat according to the invention is shown in FIG. 1. By means of the illustrated coordinate system, the seat length direction 1x, the seat width direction 1y and the seat height direction 1z are illustrated.

Figure 2A:
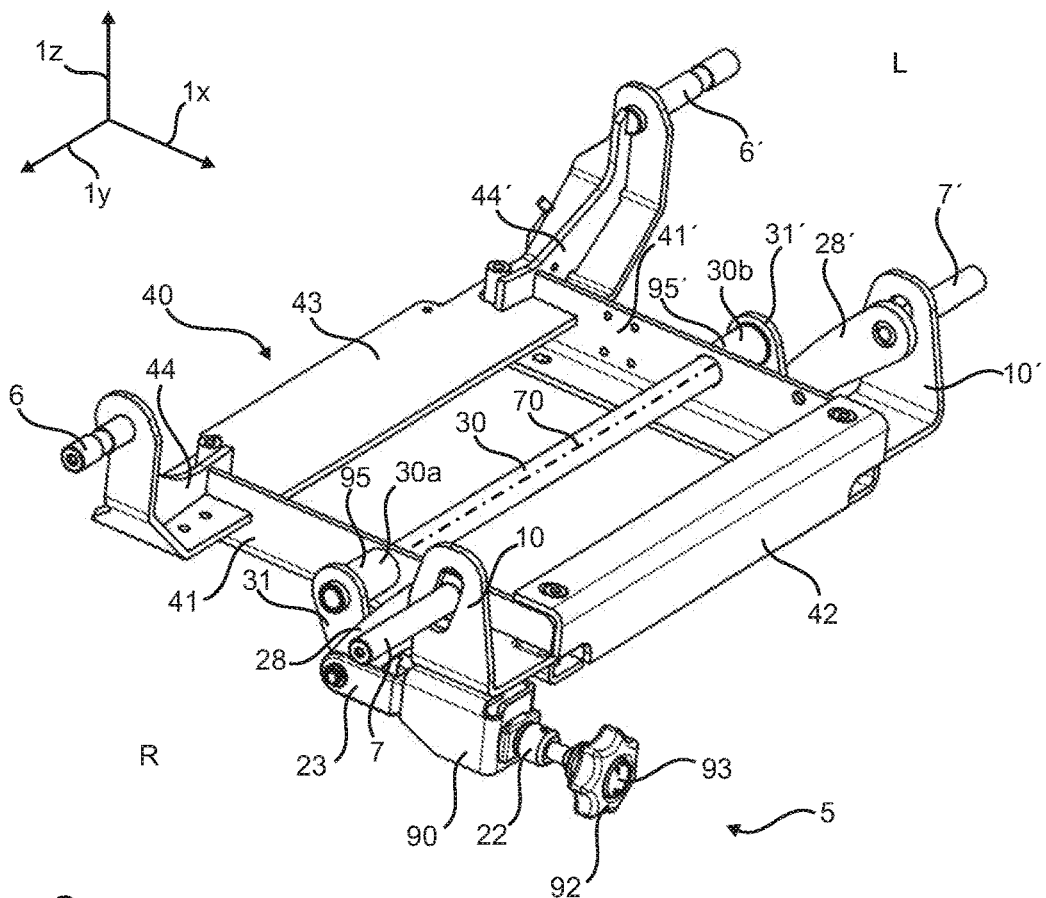
FIG. 2a, b are perspective views of a seat substructure of the vehicle seat of FIG. 1.
Figure 2B:
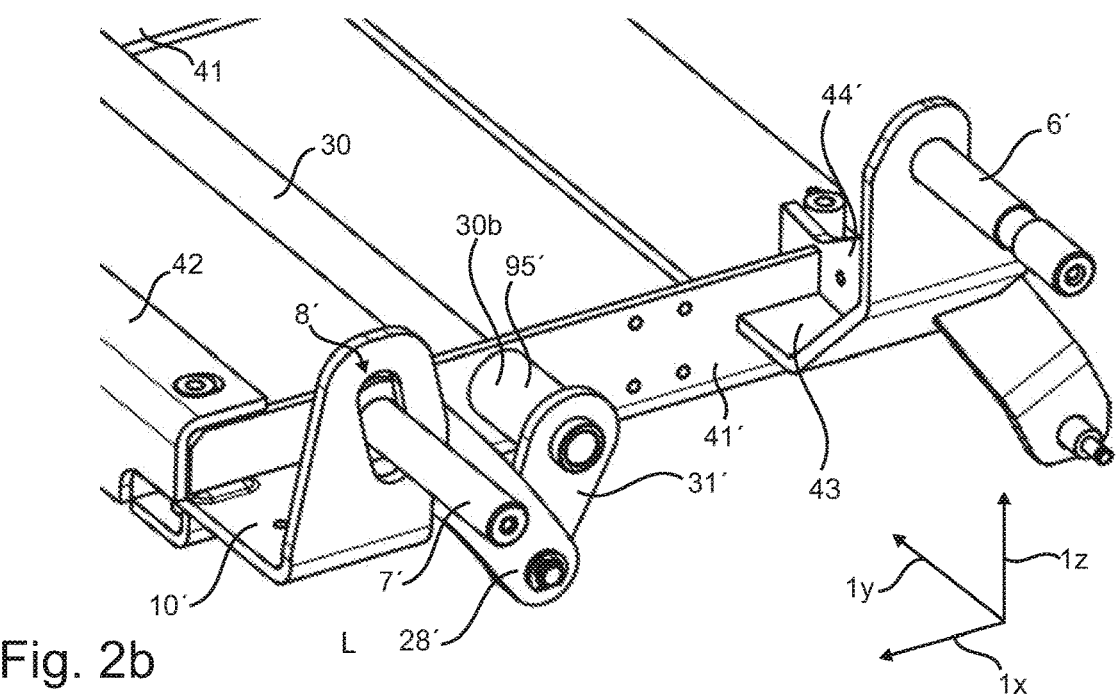
Figure 4A:
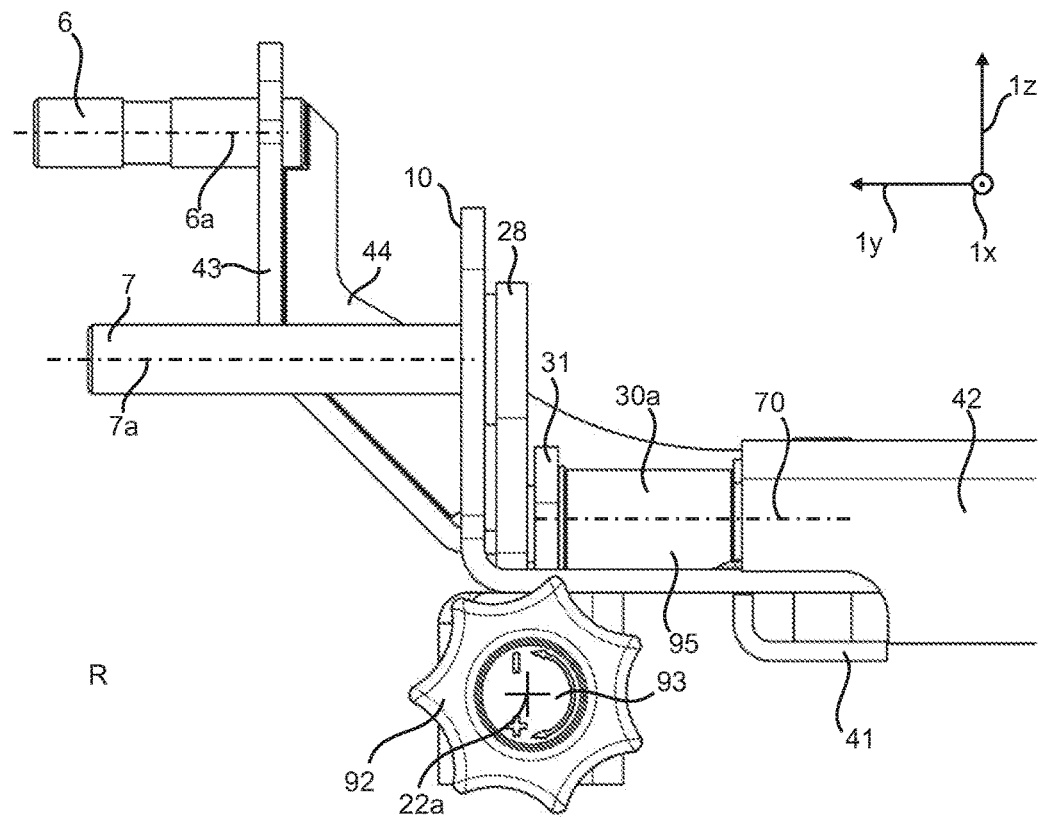
FIG. 4a, b are front views of the adjustment device on the left and on the right side of the vehicle seat of FIG. 1.
Figure 4B:
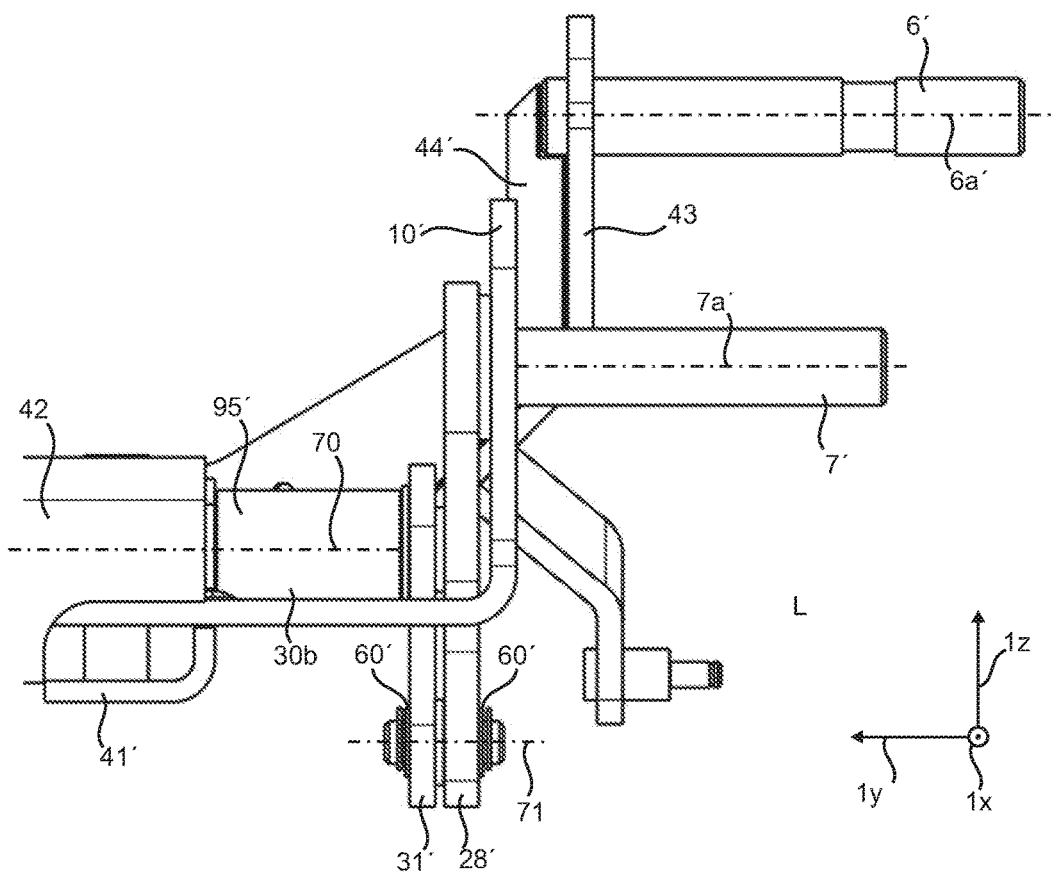
Figure 5A:
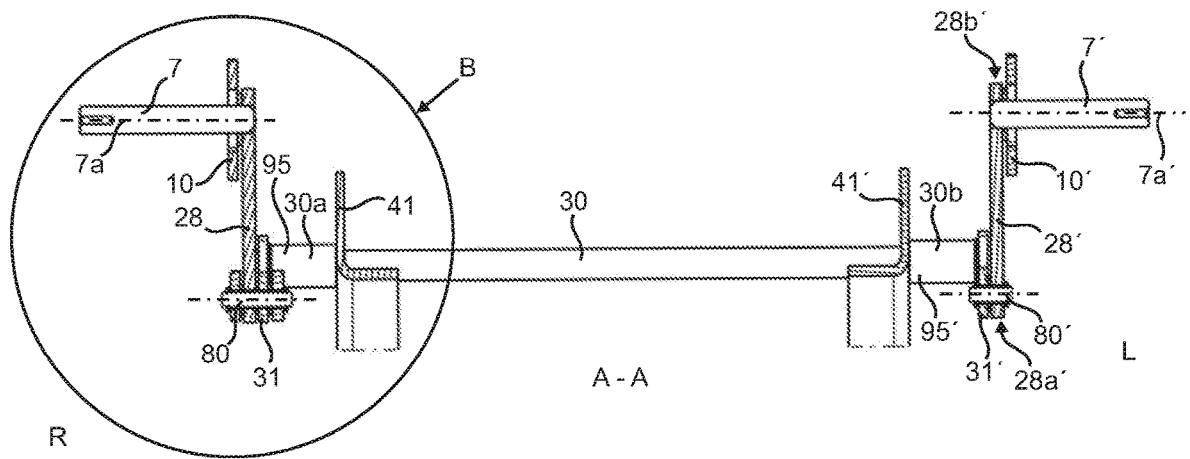

It should firstly be mentioned that FIGS. 2a and 5a show both sides L, R of the vehicle seat 1. FIGS. 1, 2b, 3c and 4b show the left side L of the vehicle seat 1 from the perspective of the seat occupant. FIGS. 3a, 3b, 4a and 5b show the right side R of the vehicle seat 1 from the perspective of the seat occupant. According to FIG. 3a, a plane E1 is also shown, which represents the sectional plane for the view according to FIG. 5a and which is configured to extend through the axis 7a and the axis of rotation 71.

The vehicle seat 1 has, for example, a seating part 2 and a backrest part 3. On both sides L, R of the vehicle seat 1 an operating device 4, 4' for operating vehicle seat functions and/or vehicle functions, in the present case in the form of a joystick, is arranged, wherein, according to FIG. 1, the operating device 4 on the right side R is covered by the operating device 4' on the left side L. Also, an adjustment device 5 for adjustment of a vertical position and/or an inclination of the operating devices 4, 4' is provided.

Thus, in FIG. 1, a vehicle seat 1 is shown, which has a laterally positioned operating device 4', in this case on the left side L, for operating vehicle seat functions and/or vehicle functions and an adjustment device 5 for adjustment of a vertical position Δz and/or an inclination α of the operating devices 4, 4' with respect to a rest of the vehicle seat 1.

In this case, the adjustment device 5 comprises, on the right side R, a rotational axis 6 extending in the seat width direction 1y and a shaft 7 which is connected to the operating device 4, spaced from the rotational axis 6 and pivotable together with the operating device 4 about the rotational axis 6.

Another rotational axis 6' of the adjustment device 5 extending in the seat width direction 1y and another shaft 7' which is connected to the operating device 4' are positioned on the left side L, in a mirror-symmetrical manner with respect to a plane E2 which extends in the seat height direction 1z and in the seat length direction 1x (see FIG. 1), wherein the other shaft 7' is spaced from the rotational axis 6' and is pivotable together with the operating device 4' about the rotational axis 6'.

All further descriptions which relate to elements arranged in a mirror-image manner therefore apply similarly to both sides L, R of the vehicle seat 1, even if they are described for the sake of clarity only for one side L or R. This applies in particular to the following elements, which are arranged on both sides L and R of the vehicle seat: operating devices 4, 4', rotational axis 6, 6' with central axes 6a, 6a', shafts 7, 7' with central axes 7a, 7a', slotted guide elements 10, 10' with slotted guides 8, 8', first lever elements 28, 28' and second lever elements 31, 31'. The elements on the left side L are hereby denoted with a prime (example: rotational axis 6') whereas the elements on the right side R are not (example: rotational axis 6).

Figure 3A:
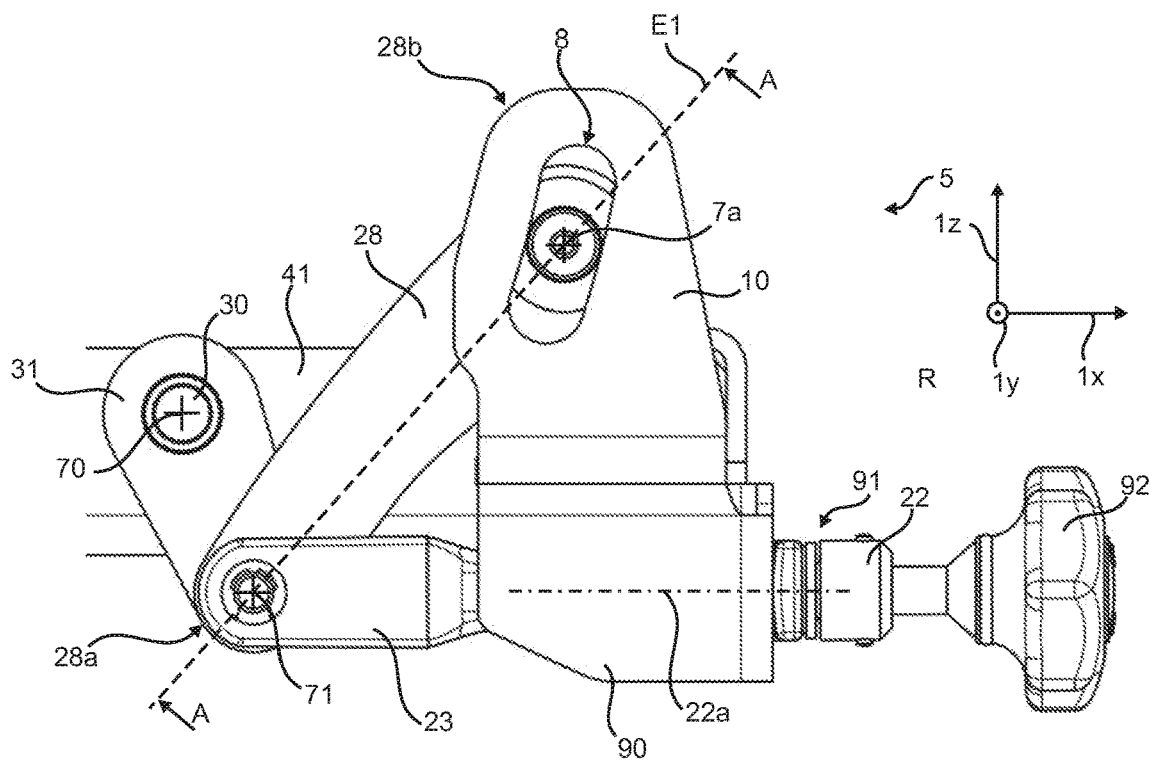
FIG. 3a-c are side views of the adjustment device of the vehicle seat of FIG. 1 from the left and from the right.
Figure 3B:
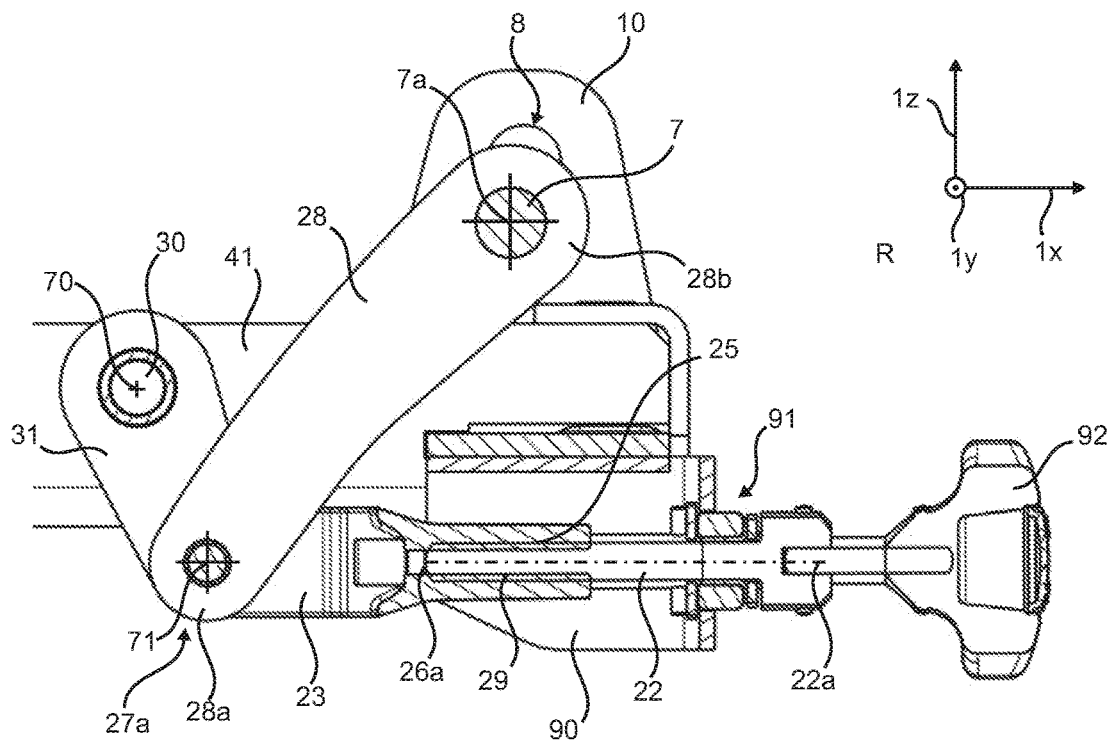
Figure 3C:
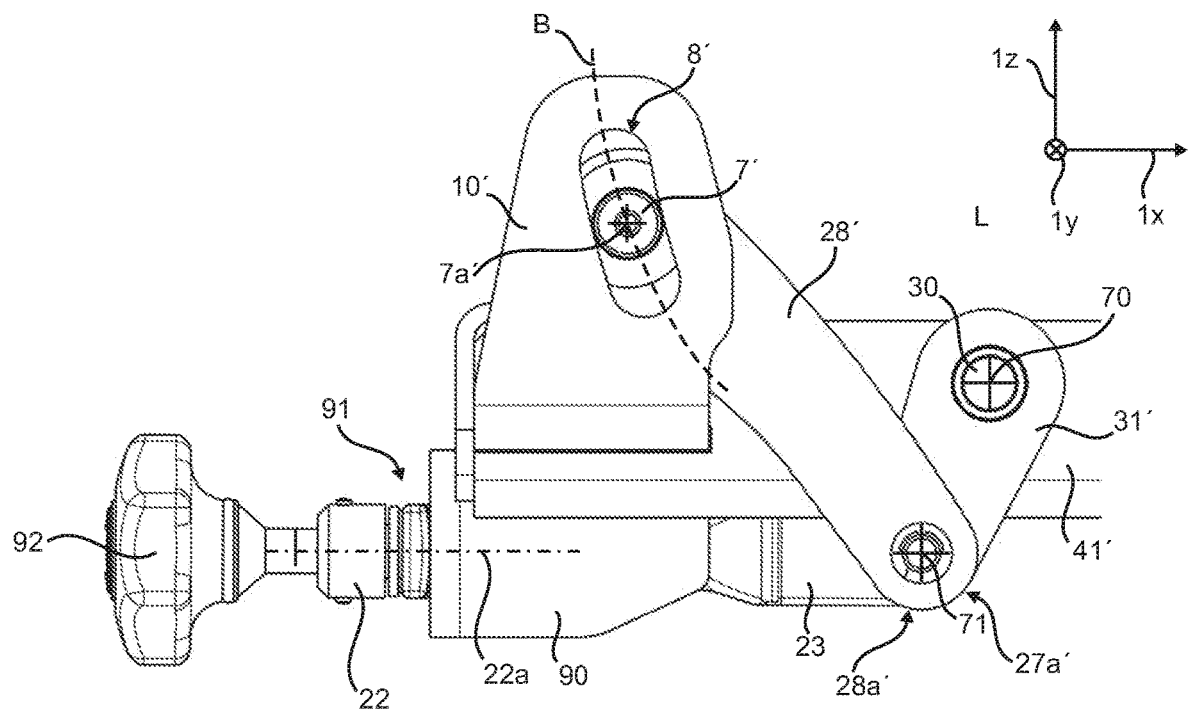

Also shown in FIG. 1 is the handle element 92 of a spindle element 22 (see in particular FIGS. 2a and 3b). The adjustment of the vertical position Δz and/or the inclination α of the operating device 4, 4' is feasible in the present case by means of a rotational movement of the spindle element 22, in operative contact with the shaft 7, of the adjustment device 5, wherein a central axis 22a of the spindle element 22 is positioned perpendicular to a central axis 7a of the shaft 7. In the present case, the spindle element 22 is arranged completely beneath the shaft 7. The rotational movement of the spindle element 22 is feasible by means of a rotation of the handle element.

As will be explained below, the spindle element 22 is also in operative contact with the other shaft 7'; furthermore, the central axis 22a of the spindle element 22 is perpendicular to a central axis 7a' of the shaft 7'. In the present case, the spindle element 22 is arranged completely beneath the shaft 7'.

In the present case, a distance ΔL between the central axis 6a of the rotational axis 6 and the central axis 7a of the shaft 7 has a value of 237.4 mm.

FIG. 4a shows that the spindle element 22 is connected to the handle element 92 configured as a hand knob, and that the handle element 92 is provided with a display device 93 which is configured as a double-headed rotary arrow and provided with the signs "+" for "raise" or "−" for "lower".

In the present case, this handle element 92 is positioned, in the length direction 1x of the vehicle seat 1 next to the spindle element 22, on the right side R of the vehicle seat 1 and beneath the seating part 3 of the vehicle seat 1.

In the present case, the vehicle seat 1 is provided with a single adjustment device 5 and with an operating device 4, 4' on both sides, i.e. on the left side L and right side R of the user.

In the present case, the distance ΔL between the rotational axis 6 and the shaft 7 is permanently set and the rotational axis 6 is arranged behind the shaft 7 in the seat length direction 1x and above the shaft 7 in the seat height direction 1z. Furthermore, the shaft 7 is arranged in the seat height direction 1z above the spindle element 22.

As part of the operative connection between the shaft 7 and the spindle element 22, a slide element 23 is arranged at a first end 26a of the spindle element 22, wherein an internal thread 25 of the slide element 23 is in operative contact with an external thread 29 of the spindle element 22 (see FIG. 3b), so that the rotational movement of the spindle element 22 is transmissible into a translational movement of the slide element 23.

In the present case, a bent sheet metal part is arranged as a bearing element 90, by means of which the spindle element 22 is mounted so as to be rotatable relative to a seat substructure 40 of the vehicle seat 1, and which is indirectly connected to the seat substructure 40. According to FIGS. 3a to 3c, a bearing unit 91 connects the spindle element 22 to the support element 90. This bearing unit 91 includes, for example, ball bearings, bushings and/or discs and is not described in detail here.

As another part of the operative connection between the spindle element 22 and the shaft 7, a first lever element 28 is rotatably mounted about an axis of rotation 71 and by means of a first end 28a, on a first end 27a of the slide element 23 which is remote from the spindle element 22, wherein a second end 28b of the first lever element 28 is connected to the shaft 7.

In the present case, the first end 28a of the first lever element 28 and the first end of the slide element 23 are each provided with a hole by means of which a rotary bearing element for the described mutually rotatable mounting of the two elements 28, 22 about the axis of rotation 71 can be received.

Figure 5B:
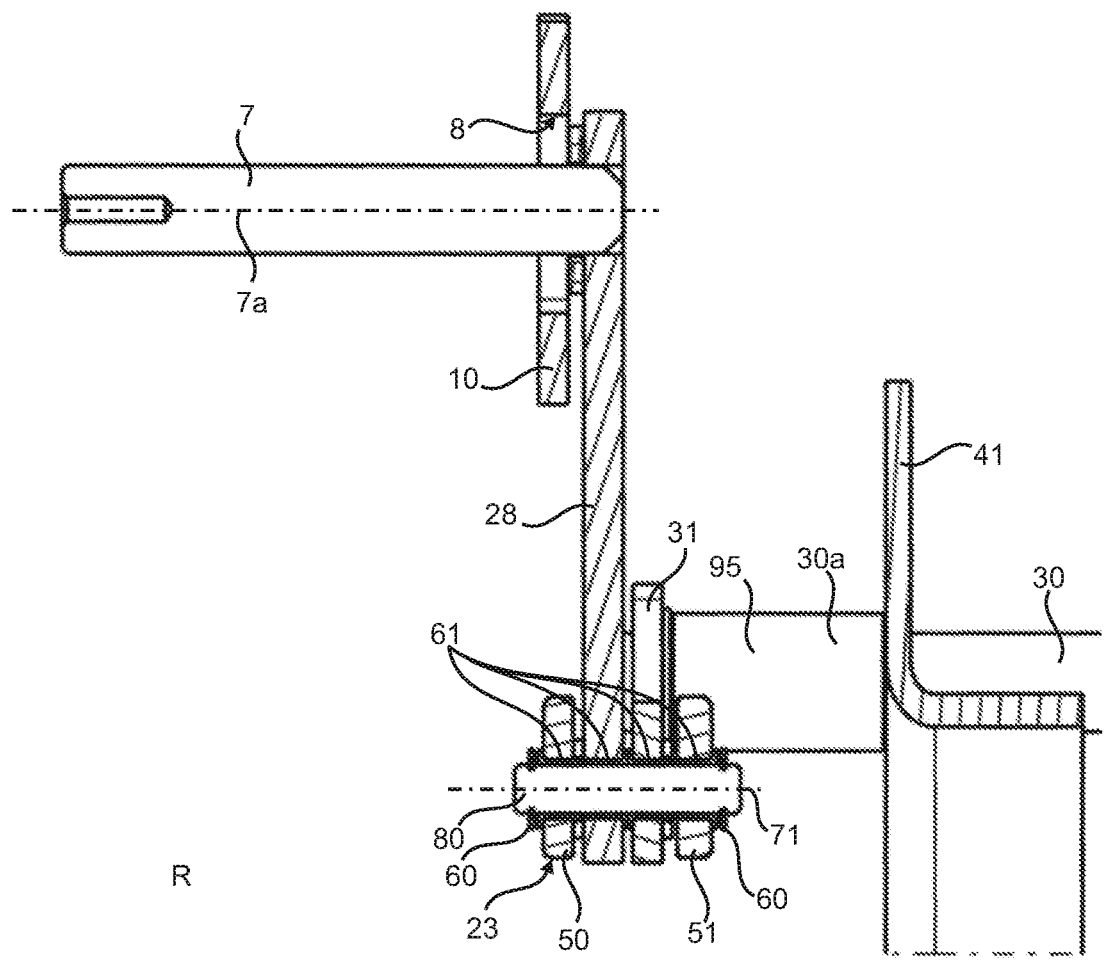

The rotary bearing element comprises, according to FIG. 5b, a shaft element 80 and two fork elements 50, 51, which in the present case are configured as plate-shaped elements and are arranged on the shaft element 80 to one side of the first 28 or the second lever element 31. In the present case, the first end 27a of the slide element 23 forms the fork elements 50, 51.

Furthermore, the rotary bearing element comprises securing elements 60, which in the present case are configured as external securing rings and are arranged on one side of the fork elements 50, 51. Bushing elements 61 in the form of sintered bushings are arranged between a shaft element 80 and the fork elements 50, 51 and the lever elements 28, 31.

Since the slide element 23 is arranged only on the right side R of the vehicle seat 1, the left side L includes a shaft element 80', which is shorter than the shaft element 80, and securing elements 60', but no fork elements.

In the present case, the spindle element 22, the slide element 23 and the first lever element 28 are arranged parallel to each other with respect to their longitudinal extension. Similarly, the slide element 23 and the first lever element 28 are arranged, with respect to their longitudinal extension, perpendicular to the central axis 7a of the shaft 7, exactly like the central axis 22a of the spindle element 22.

In the present case, the shaft 7 is movable, with respect to the pivoting about the rotational axis 6, within a slotted guide 8 of a slotted guide element 10 (see FIGS. 3a and 3c), wherein a shape of the slotted guide 8 is configured to extend along a portion of an arc B, wherein in the present case the arc B extends concentrically about the rotational axis 6. In this case, the slotted guide element 10 is arranged at a bearing point of the seat substructure 40 and is not movable with the shaft 7.

In the present case, the seat substructure 40 comprises two longitudinal struts 41, 41' extending in the seat length direction 1x, and a front 42 and a rear cross strut 43, which each extend in the seat width direction 1y. The rear cross strut 43 forms the bearing point for the rotational axis 6, 6' on both sides of the seat substructure 40. The rear cross strut 43 is thus formed continuously from the left side L to the right side R of the vehicle seat 1. In the present case, it is additionally reinforced on both sides by means of a stiffening strut 44, 44' in the form of a gusset plate, which in the present case is welded to the rear cross strut 43.

In the present case, the rotational axis 6 is guided through a hole in the rear cross strut 43 and rigidly connected to the gusset plate 44 by means of a welded connection.

According to FIGS. 2a and 3b, it can be seen that the bearing element 90 for the spindle element 22 is arranged directly and completely beneath the slotted guide element 10 and is connected thereto.

Furthermore, it is shown in FIG. 1 that the operating device 4 and the shaft 7 are connected by means of an intermediate element 94, wherein this intermediate element 94 is realised here as a housing part. Within or on this intermediate element 94, other elements (not shown) such as electronic components, the power supply or the controller of the operating device are arranged.

Thus, within the slotted guide 8 described above, the shaft 7 can be pivoted securely mechanically guided by a certain angle, preferably by +4° to −4°, starting from a home position of 0°. It is understood that the entire operating device 4 pivots with the shaft 7, namely about the rotational axis 6.

The vehicle seat 1 shown has, as mentioned, two operating devices 4, 4', one 4' of which is positioned on the left L and the other 4 on the right side R of the seating surface. The adjustment device 5 is arranged on both sides L, R of the vehicle seat 1, but only some of the components or elements of the adjustment device 5 are arranged in duplicate on both sides L, R.

Accordingly, the spindle element 22, the slide element 23, the handle element 92 with the display device 93, the bearing element 90 and means (not described in more detail) for connecting these elements 22, 23, 92, 93, 90 or for attaching these elements 22, 23, 92, 93, 90 to the rest of the vehicle seat 1 are arranged only on one side, in this case only on the right side R of the vehicle seat 1.

In the present case, the rotational axis 6, 6', the shaft 7, 7', the slotted guide element 10, 10', the first lever element 28, 28' and the second lever element 31, 31' and means (not described in more detail) for connecting these elements or for attaching these elements 6, 6', 7, 7', 10, 10', 28, 28', 31, 31' to the rest of the vehicle seat 1 are arranged on both sides L, R of the vehicle seat 1 and thus present in duplicate.

The elements 6, 7, 10, 28, 31 of the adjustment device 5 which are arranged on the first or right side R of the vehicle seat 1 are configured identically to the corresponding elements 6', 7', 10', 28', 31' which are arranged on the second or left side L of the vehicle seat 1.

In the seat width direction 1y, a shaft element 30 is arranged, the first end 30a of which is rotatably connected to the first end 28a of the first lever element 28 by means of the second lever element 31 which is rigidly connected to the shaft element 30, wherein a second end 30b of the shaft element 30 is rigidly connected to the other second lever element 31'.

The other second lever element 31' is also rotatably connected to a first end 28a' of another first lever element 28' (see in particular FIG. 5a). This first end 28a' of the other first lever element 28' is in turn connected to another shaft 7' by means of a second end 28b'. This other shaft 7' is in turn connected to the other operating device 4'.

In the present case, the shaft element 30 is rotatably mounted on the seat substructure 40. For this purpose, both longitudinal struts 41, 41' have a hole through which the shaft element 30 is guided. Bushing elements 95, 95' are arranged between the longitudinal struts 41, 41' and the second lever elements 31, 31' at both ends 30a, 30b of the shaft element 30 and ensure axial securing of the shaft element 30, i.e. in the seat width direction 1y.

The first lever element 28 is connected to the one end 27a of the slide element 23 and rotatably mounted in relation thereto by means of the axis of rotation 71. The second lever element 31 is also connected to the one end 27a of the slide element 23 and rotatably mounted in relation thereto by the axis of rotation 71.

Since, via the centrally arranged shaft 30 and by means of the described mechanical system, the rotational movement of the spindle element 22 is transmissible into a rotational movement of the shaft 7' on the left side L and at the same time into a rotational movement of the shaft 7 on the right side R of the vehicle seat 1, an adjustment of the vertical position Δz and/or of the inclination α of both operating devices 4, 4' is feasible by means of a single spindle element 23.

It is understood that the embodiment explained above is only a first embodiment of the vehicle seat according to the invention. In this respect, the embodiment of the invention is not limited to this example.

All features disclosed in the application documents are claimed as essential to the invention, provided that they are novel, individually or in combination, over the prior art.

LIST OF REFERENCE NUMERALS 1 vehicle seat
1x seat length direction
1y seat width direction
1z seat height direction
4, 4' operating device
5 adjustment device
6, 6' rotational axis
6a, 7a, 22a central axis
7, 7' shaft
8, 8' slotted guide
10, 10' slotted guide element
22 spindle element
23 slide element
25 internal thread
26a, 27a, 28a, 28a', 28b, 28b', 30a, 30b end
28, 28', 31, 31' lever element
29 external thread
30, 80, 80' shaft element
40 seat substructure
41, 41' longitudinal strut
42, 43 cross strut
44 stiffening strut
50, 51 fork element
60 securing element
61, 95, 95' bushing element 70, 71 axis
90 bearing element
91 bearing unit
92 handle element
93 display device
94 intermediate element
B arc
E1, E2 plane
L, R side
α inclination
ΔL distance
Δz vertical position

What is claimed is:

1. A vehicle seat, comprising:
   at least one laterally positioned operating device for operating at least one of vehicle seat functions or vehicle functions; and
   an adjustment device for adjusting at least one of a vertical position or an inclination of the at least one operating device with respect to a rest of the vehicle seat,
   wherein the adjustment device comprises a rotational axis extending in the seat width direction and a shaft that is connected to the operating device, positioned at a distance from the rotational axis and rotatable together with the operating device about the rotational axis,
   wherein the adjustment of at least one of the vertical position or of the inclination of the operating device includes a rotational movement of a spindle element of the adjustment device, which is in operative contact with the shaft,
   wherein a central axis of the spindle element is arranged perpendicular to a central axis of the shaft,
   wherein the adjustment device further comprises:
      a slide element arranged at a first end of the spindle element;
      a first lever element, wherein a first end of the first lever element is rotatably mounted to an axis of rotation located on a first end of the slide element, and wherein a second end of the first lever element is connected to the shaft;
      a shaft element arranged in the seat width direction; and
      a second lever element,
   wherein a first end of the second lever element is rigidly connected to the shaft element, and
   wherein the first end of the first lever element, the second end of the second lever element, and the first end of the slide element are joined at the axis of rotation.

2. The vehicle seat according to claim 1, wherein a distance between the rotational axis and the shaft is permanently set and the rotational axis is positioned behind the shaft in the seat length direction.

3. The vehicle seat according to claim 1, wherein an internal thread of the slide element is in operative contact with an external thread of the spindle element, so that the rotational movement of the spindle element is transmissible into a translational movement of the slide element.

4. The vehicle seat according to claim 1, wherein a locking of the shaft is achievable by means of the interaction between an internal thread of the slide element and an external thread of the spindle element, wherein the adjustment device is provided free from an additional locking device for locking a position of the shaft with respect to the pivoting about the rotational axis.

5. The vehicle seat according to claim 1, wherein the first end of the slide element is remote from the spindle element.

6. The vehicle seat according to claim 1, wherein the shaft is movable within a slotted guide of a slotted guide element with respect to the pivoting about the rotational axis.

7. The vehicle seat according to claim 1, wherein the second lever element is offset from the vehicle seat.

8. The vehicle seat according to claim 6, wherein the slotted guide is shaped to extend along a portion of an arc, and wherein the arc is configured to extend concentrically with respect to the rotational axis.

9. A vehicle seat, comprising:
   at least one laterally positioned operation device for operating at least one of vehicle seat functions or vehicle functions; and
   an adjustment device for adjusting at least one of a vertical position or an inclination of the at least one operating device with respect to a remainder of the vehicle seat,
   wherein the adjustment device comprises a rotational axis extending in the seat width direction and a shaft that is connected to the operating device, positioned at a distance from the rotational axis and rotatable together with the operating device about the rotational axis,
   wherein the adjustment of at least one of the vertical position or of the inclination of the operating device includes a rotational movement of a spindle element of the adjustment device, which is in operative contact with the shaft, wherein a central axis of the spindle element is arranged perpendicular to a central axis of the shaft,
   wherein the adjustment device further comprises:
      a slide element arranged at a first end of the spindle element;
      a first lever element, wherein a first end of the first lever element is rotatably mounted to an axis of rotation located on a first end of the slide element, and wherein a second end of the first lever element is connected to the shaft;
      a shaft element arranged in the seat width direction; and
      a second lever element,
   wherein a first end of the second lever element is rigidly connected to the shaft element,
   wherein the first end of the first lever element, the second end of the second lever element, and the first end of the slide element are joined at the axis of rotation,
   wherein the shaft is moveable within a slotted guide of a slotted guide element with respect to the pivoting about the rotational axis, and
   wherein a shape of the slotted guide is configured to extend along a portion of an arc.

* * * * *